(12) United States Patent
Dudar (10) Patent No.: US 10,444,767 B2
(45) Date of Patent: Oct. 15, 2019

(54) VEHICLE RUNNING BOARD OPERATION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 177 days.

(21) Appl. No.: 15/498,939

(22) Filed: Apr. 27, 2017

(65) Prior Publication Data

US 2018/0314269 A1 Nov. 1, 2018

(51) Int. Cl.
| | |
|---|---|
| *G05D 3/10* | (2006.01) |
| *B60R 3/02* | (2006.01) |
| *B60R 16/03* | (2006.01) |
| *B60R 3/00* | (2006.01) |
| *B62D 37/02* | (2006.01) |

(52) U.S. Cl.
CPC ............. *G05D 3/10* (2013.01); *B60R 3/02* (2013.01)

(58) Field of Classification Search
CPC .. G05D 3/10; B60R 3/02; B60R 16/03; B60R 3/00; B60R 3/007; B62D 37/02
USPC ............................................................ 701/49
See application file for complete search history.

(56) References Cited

U.S. PATENT DOCUMENTS

| | | | |
|---|---|---|---|
| 2007/0159308 A1* | 7/2007 | Johnston | B60P 3/36 340/425.5 |
| 2008/0271936 A1 | 11/2008 | Kuntze et al. | |
| 2010/0194070 A1* | 8/2010 | Stauffer | B60R 3/002 280/166 |
| 2012/0098231 A1 | 4/2012 | Huotari et al. | |
| 2017/0137075 A1* | 5/2017 | Povinelli | B62D 35/008 |
| 2017/0190308 A1 | 7/2017 | Smith et al. | |
| 2018/0134221 A1* | 5/2018 | Burton | B60R 3/02 |

FOREIGN PATENT DOCUMENTS

| | | |
|---|---|---|
| CN | 204801649 U | 11/2015 |
| GB | 2010192 A | 6/1979 |
| GB | 2556162 A | 5/2018 |
| KR | 1020140077735 U | 6/2014 |
| WO | WO 200253416 A2 | 7/2002 |

OTHER PUBLICATIONS

Search Report from United Kingdom Intellectual Property Office dated Oct. 11, 2018 regarding Application No. GB1806664.7 (3 pages).

* cited by examiner

*Primary Examiner* — Yazan A Soofi
(74) *Attorney, Agent, or Firm* — Frank A. MacKenzie; Bejin Bieneman PLC (57) ABSTRACT

A first fuel economy value of a vehicle is determined upon extension of a running board. The running board is determined to be operational when the first fuel economy value is below an estimated vehicle fuel economy value by at least a first predetermined threshold.

20 Claims, 4 Drawing Sheets

VEHICLE RUNNING BOARD OPERATION

BACKGROUND

Vehicles can include running boards to assist ingress and egress of users into a vehicle cabin. The running board provides support for the user, allowing the user to lift his or her legs less to enter the vehicle cabin. The running board may deploy to assist ingress and egress when the vehicle is stationary, and the running board may retract when the vehicle is in motion. However, if a running board fails to retract when it should, vehicle fuel efficiency can be adversely affected. On the other hand, if a running board fails to extend when it should user safety and/or convenience can be impaired.

DETAILED DESCRIPTION

A system includes a computer programmed to determine a first fuel economy value of a vehicle upon extension of a running board and to determine that the running board is operational when the first fuel economy value is below an estimated vehicle fuel economy value by at least a first predetermined threshold.

The computer can be further programmed to determine a second fuel economy value of the vehicle upon retraction of the running board. The computer can be further programmed to determine that the running board is operational when the second fuel economy value is greater than the first fuel economy value by at least a second predetermined threshold.

The computer can be further programmed to operate a vehicle propulsion in a single fuel mode when the running board is extended.

The computer can be further programmed to actuate a vehicle component upon determining that the running board is not operational.

The estimated vehicle fuel economy value can be based on a fuel economy estimation determined when the running board was previously determined to be operational.

The computer can be further programmed to, prior to embarking on a predetermined route, identify a portion of the route on which to extend the running board. The identified portion of the route can be substantially straight.

The computer can be further programmed to instruct the running board to extend upon identifying no target vehicles within a distance threshold of the vehicle.

The first fuel economy value can be one of a fluid fuel consumption rate and a battery discharge rate.

A method includes determining a first fuel economy value of a vehicle upon extension of a running board and determining that the running board is operational when the first fuel economy value is below an estimated vehicle fuel economy value by at least a first predetermined threshold.

The method can further include determining a second fuel economy value of the vehicle upon retraction of the running board. The method can further include determining that the running board is operational when the second fuel economy value is greater than the first fuel economy value by at least a second predetermined threshold.

The method can further include operating a vehicle propulsion in a single fuel mode when the running board is extended.

The method can further include actuating a vehicle component upon determining that the running board is not operational.

In the method, the estimated vehicle fuel economy value can be based on a fuel economy estimation determined when the running board was previously determined to be operational.

The method can further include, prior to embarking on a predetermined route, identifying a portion of the route on which to extend the running board. The identified portion of the route can be substantially straight.

The method can further include instructing the running board to extend upon identifying no target vehicles within a distance threshold of the vehicle.

In the method, the first fuel economy value can be one of a fluid fuel consumption rate and a battery discharge rate.

Figure 1:
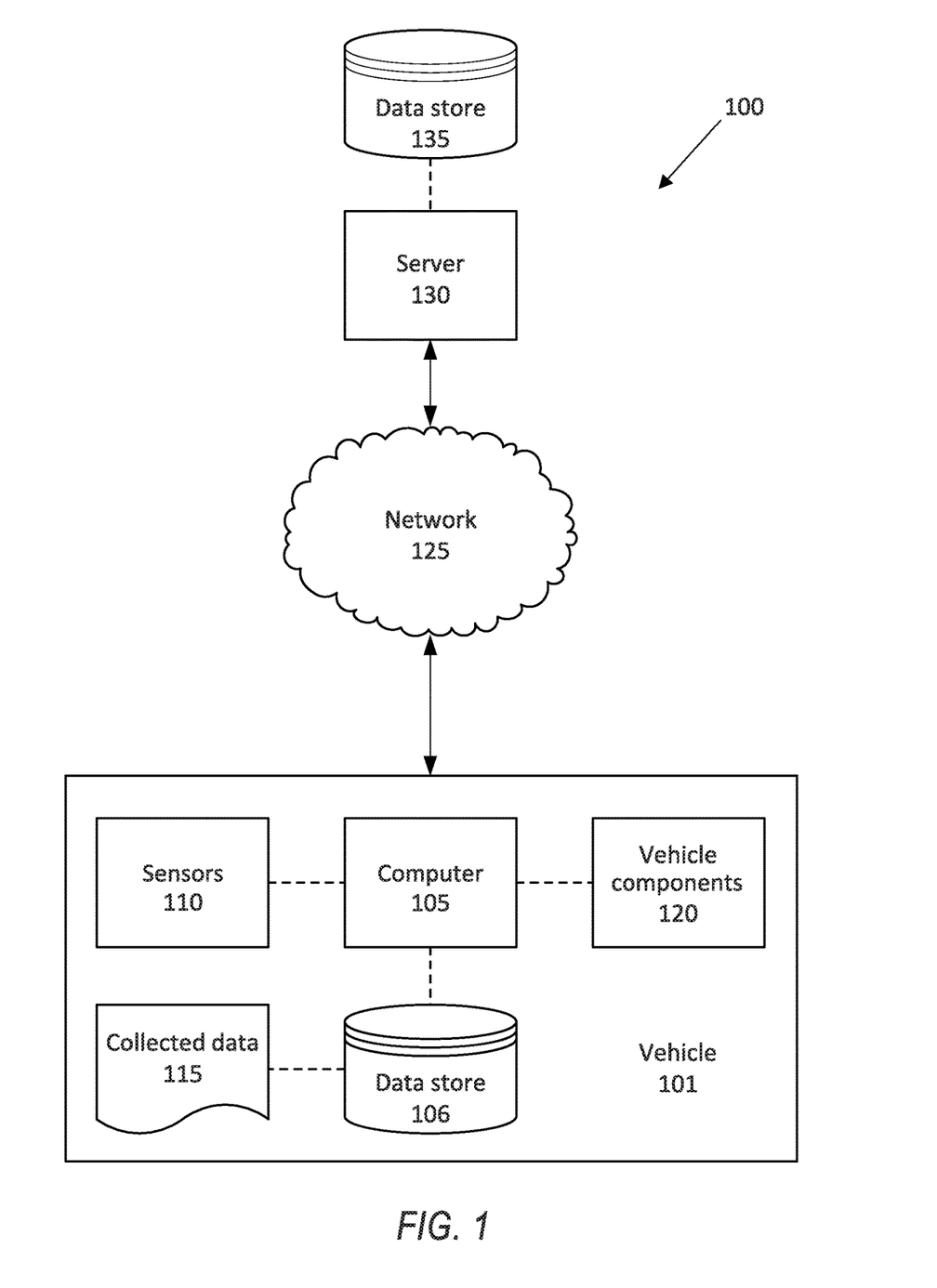
FIG. 1 is a block diagram of an example system for operating a running board in a vehicle.

FIG. 1 illustrates a system 100 for determining whether a running board 210 of a vehicle 101 is operational. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
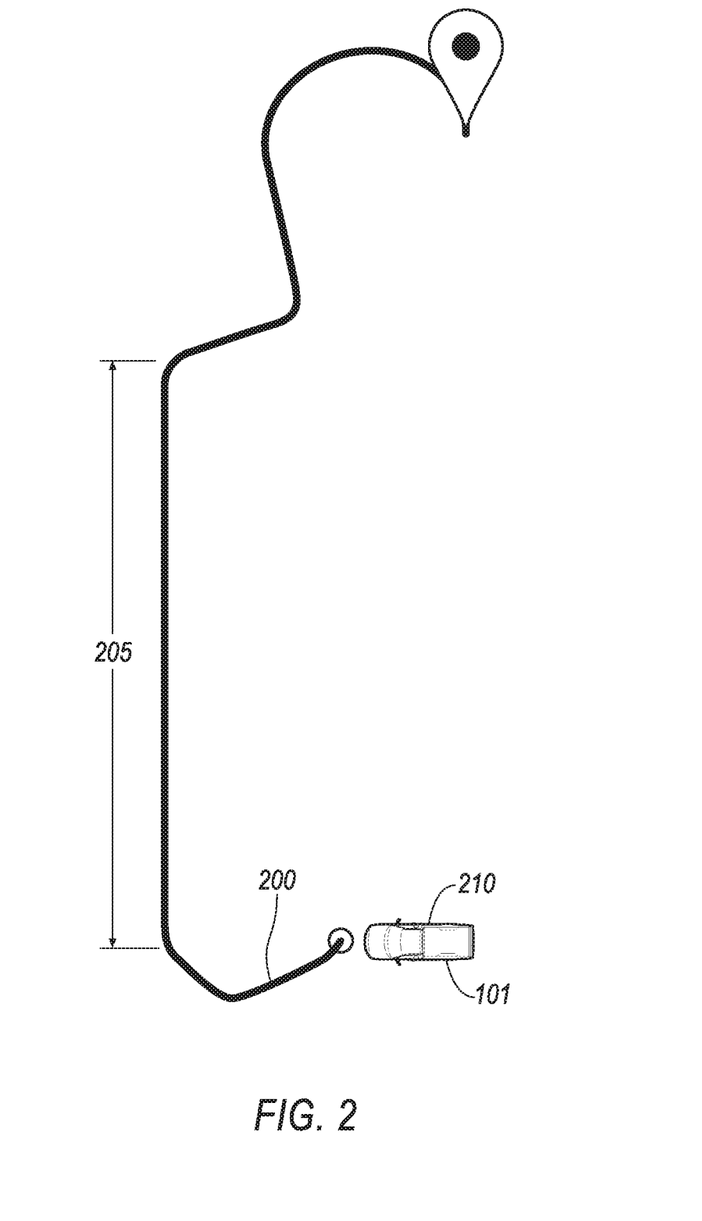
FIG. 2 illustrates an example route that the vehicle travels to determine operability of the running board.

FIG. 2 illustrates an example route 200 that the vehicle 101 follows. The route 200 can be predetermined by the computer 105 based on a destination provided by the operator of the vehicle 101. The computer 105 can use known route-determining methods to determine the route 200 from the position of the vehicle 101 to the destination.

The computer 105 can be programmed to determine a portion of the route 200 to measure the fuel economy of the vehicle 101, i.e., amount of fuel consumed per distance traveled, e.g., miles per gallon. Prior to embarking on the route 200, the computer 105 can collect data 115 about the roadways along the route 200. The computer 105 can identify a portion of the route 200 to instruct the running board 210 to extend. The portion of the route 200 is shown in FIG. 2 as a path 205. As described below, the path 205 can be determined as a portion of the route 200 where the fuel economy can be measured such that effects that can alter the fuel economy measurements (e.g., traffic, turns, traffic stops, etc.) other than the position of the running board 210 can be minimized.

The computer 105 can determine the fuel economy of the vehicle 101. The fuel economy of the vehicle 101 can typically be determined as the amount of energy expended by the propulsion divided by the distance traveled. As described above, the position of the running board 210 can affect the fuel economy, so when the vehicle 101 is on the portion of the route 200 having favorable conditions, the position of the running board 210 can be determined based on the fuel economy.

The fuel economy of the vehicle 101 can be determined based on an energy consumption of the propulsion 120. As described above, the propulsion 120 can be, e.g., an internal combustion engine, an electric motor powered by a battery, and/or a hybrid combination of the internal combustion engine and the electric motor. The computer 105 can operate the propulsion in a single-fuel mode to determine the fuel economy. That is, when the propulsion 120 is a hybrid internal combustion engine/electric motor propulsion 120, the computer 105 can operate the propulsion 120 only one of the internal combustion engine and the battery-powered electric motor to determine the fuel economy. That is, the fuel economy can be based on one of a fluid fuel consumption of the internal combustion engine (e.g., gasoline, diesel, ethanol, biobutanol, natural gas, etc.) and a battery discharge rate of the battery-powered motor.

The computer 105 can determine the fuel economy based on the length of the path 205 and the fuel consumed along a portion of the path 205. As described above, the path 205 can be determined as a portion of the route with one or more favorable conditions, e.g., the path 205 is substantially straight, the propulsion 120 "warm," i.e., has been activated for longer than a predetermined period of time (stored in the data store 106 and/or the server 130) after embarking on the route 200, the path 205 has no traffic stops, etc. When the computer 105 operates the propulsion 120 in a fluid fuel mode, the computer 105 can determine the fuel economy by measuring the amount of fluid fuel consumed by the propulsion and dividing the volume of fuel consumed by the distance traveled along the path 205 while measuring the fuel consumption. When the computer 105 operates the propulsion 120 in a fully electric mode, the computer 105 can determine the fuel economy by measuring the amount of electric charge spent by the battery and dividing the spent charge by the distance traveled along the path 205. Furthermore, the computer 105 can use known electric discharge conversion rates to equivalent fuel volumes to determine the fuel economy, e.g., 33.7 kWh of electricity=1 gallon of gasoline, etc. The fuel economy value can be expressed as a volume of fuel (or volume equivalent conversion) per distance traveled, e.g., miles per gallon (mpg). A first fuel economy value is "greater" than a second fuel economy value when the first fuel economy value is larger than the second fuel economy value, e.g., 20 mpg is greater than 18 mpg. Similarly, the first fuel economy value is "lower" or "below" the second fuel economy value when the first fuel economy value is smaller than the second fuel economy value, e.g., 18 mpg is lower than 20 mpg and 18 mpg is below 20 mpg.

As described above, the path 205 can be determined by identifying a portion of the route 200 having one or more favorable conditions for determining fuel economy. Fuel economy can be affected by a plurality of driving scenarios, e.g., towing a trailer, a cold engine, changes in elevation, aggressive acceleration and deceleration, nonstandard fuel blends (e.g., 85% ethanol), etc. Thus, the favorable conditions that define the path 205 can be determined based on these scenarios. Example favorable conditions include, e.g., the vehicle 101 not towing a trailer, a predetermined period of time elapsed to allow the engine to warm, a road grade below a road grade threshold, a road grade that does not change beyond a road grade change threshold, a posted speed limit that does not change along the portion of the route 200, no traffic stops along the portion of the route 200, consistent traffic along the portion of the route 200, etc. The computer 105 can identify the path 205 as the portion of the route 200 satisfying a predetermined number of these favorable conditions. The predetermined number of favorable conditions can be stored in the data store 106 and/or the server 130.

The computer 105 can be programmed to instruct the running board 210 to extend upon identifying no target vehicles 101 within a distance threshold of the vehicle 101. While on the path 205, other vehicles 101, i.e., target vehicles 101, can be moving near the vehicle 101. When the running board 210 extends, the running board 210 can collide with the target vehicles 101. To prevent a potential collision, the computer 105 can be programmed to detect target vehicles 101, determine the distance between the vehicle 101 and the target vehicles 101, and instruct the running board 210 to extend when no target vehicles 101 are within the distance threshold of the vehicle 101.

Figure 3:
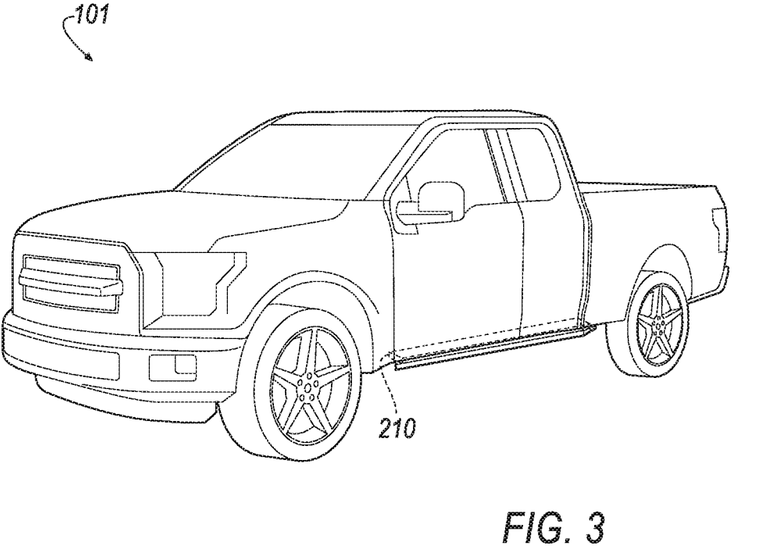
FIG. 3 is a view of the vehicle with the running board in a stowed position.
Figure 4:
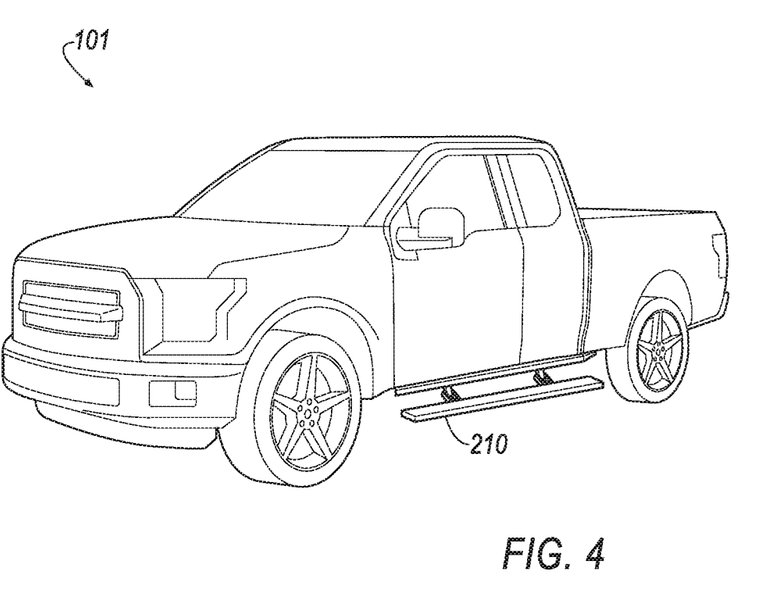
FIG. 4 is a view of the vehicle with the running board in a deployed position.

The running board 210 can be rotatably connected to the vehicle 101 rocker via an actuator (not shown), e.g., a motor. For example, when the actuator is a motor, the computer 105 can instruct the motor to rotate in a first direction to extend the running board 210 and to rotate in a second direction opposite the first direction to retract the running board 210. As shown in FIGS. 3 and 4 below, the running board 210 can extend from a stowed position to a deployed position. The computer 105 can instruct the actuator to extend the running board 210 from the stowed position inboard of the vehicle 101 rocker to the deployed position outboard of the vehicle 101 rocker.

The computer 105 can be programmed to instruct the running board 210 to extend and to determine a first fuel economy value of the vehicle 101. As used herein the terms "first" and "second" are set forth not as limitations, but for the convenience of describing the different values for the fuel economy. The first fuel economy value can be determined using the techniques described above. Because the running board 210 is extended, the aerodynamic drag on the vehicle 101 is increased, and the first fuel economy value should be lower than a measurement of the fuel economy when the running board 210 is retracted.

The computer 105 can be programmed to instruct the running board 210 to retract and to determine a second fuel economy value of the vehicle 101. Upon retracting the running board 210, the aerodynamic drag on the vehicle 101 is decreased, and the fuel economy of the vehicle 101 should increase accordingly. The computer 105 can compare the first fuel economy value determined when the running board 210 was extended to the second fuel economy value determined when the running board was retracted to determine whether the running board 210 is operational.

As used herein, the running board 210 is "operational" when the computer 105 determines that the running board 210 is in the deployed position upon instruction to move to the deployed position and that the running board 210 is in the stowed position upon instruction to move to the stowed position. The running board 210 is "not operational" when the computer 105 determines at least one of: the running board 210 is not in the deployed position upon instruction to move to the deployed position, and the running board 210 is not in the stowed position upon instruction to move to the stowed position. When the second fuel economy value is greater than the fuel economy by more than a predetermined fuel economy threshold, the computer 105 can determine that the running board 210 successfully extended and retracted. The predetermined fuel economy threshold can be determined based on an estimated change in the fuel economy from the increased aerodynamic drag generated by extending the running board 210, e.g., 2 mpg. When the fuel economy value is within the predetermined fuel economy threshold of the second fuel economy value, the computer 105 can determine that the running board 210 is not operational, e.g., the running board 210 failed either to extend or to retract.

The computer 105 can be programmed to actuate a vehicle component 120 upon determining that the running board 210 is not operational. For example, the computer 105 can send a message over the network 125 to an owner of the vehicle 101 indicating that the running board 210 is not operational. In another example, the computer 105 can actuate a propulsion 120 to move the vehicle 101 to a repair location to repair the running board 210. In another example, the computer 105 can identify a parking spot that is greater than a distance threshold (e.g., a length of a typical parking space) from another parking spot and move the vehicle 101 to the identified parking spot.

The computer 105 can be programmed to operate the propulsion 120 in a single fuel mode prior to instructing the running board 210 to extend. When the vehicle 101 is a hybrid-electric vehicle 101, i.e., the propulsion 120 includes an internal combustion engine and a battery-powered motor, the computer 105 can operate the propulsion 120 with one of the internal combustion engine or the battery-powered motor. That is, in the single fuel mode, the propulsion 120 operates solely with the internal combustion engine (consuming fluid fuel) or with the battery-powered motor (consuming electric power from the battery). The first and second fuel economy values can be more easily calculated when the computer 105 operates the propulsion 120 in the single fuel mode because only one type of fuel (fluid or electric) is consumed.

FIG. 3 illustrates the vehicle 101 with a running board 210 in the stowed position. The running board 210 can be an elongated beam that extends along a length of the vehicle 101. The running board 210 can be stowed beneath the vehicle 101 rocker. The running board 210 can be in the stowed position when the vehicle 101 is moving along the route 200. That is, the running board 210 can be used to assist occupants entering the vehicle 101 cabin, and thus can be stowed while the vehicle 101 is moving. Furthermore, when the running board 210 is in the stowed position, the total aerodynamic drag of the vehicle 101 can be reduced and the fuel economy of the vehicle 101 can increase.

FIG. 4 illustrates the vehicle 101 with the running board 210 in the deployed position. When the running board 210 is in the deployed position and the vehicle 101 is not moving, occupants can stand on the running board 210 to support ingress into the vehicle 101. When the running board 210 is in the deployed position and the vehicle 101 is moving, the increased aerodynamic drag can reduce the fuel economy of the vehicle 101.

Based on the first and second fuel economy values measured when the running board 210 is in the deployed position and the stowed position, the computer 105 can determine whether the running board 210 is operational. The data store 106 and/or the server 130 can store an estimated fuel economy value for the vehicle 101. The estimated fuel economy can be based on e.g., previously determined estimation for the fuel economy, a manufacturer-determined estimation of the fuel economy, a stored fuel economy estimation determined when the running board 210 was previously determined to be operational, etc. The computer 105 can compare the first and second fuel economy values determined when the running board 210 was in the deployed and stowed positions to the predetermined fuel economy value to determine whether the running board 210 is operational. For example, if the first fuel economy value (determined when the running board 210 is in the deployed position) is less than the estimated fuel economy value by more than a predetermined threshold, the computer 105 can determine that the running board 210 is properly in the deployed position. The predetermined threshold can be determined based on, e.g., known fuel economy models and/or previous measurements and stored in the data store 106 and/or the server 130. For example, the estimated fuel economy value of the vehicle 101 can be 20 miles per gallon (mpg), and when the running board 210 is in the deployed position, the increased aerodynamic drag can reduce the fuel economy by about 10%. The predetermined threshold can thus be 2 mpg. Furthermore, if the second fuel economy value (determined when the running board 210 is in the stowed position) is within a threshold of the estimated fuel economy value, the computer 105 can determine that the running board 210 is properly in the stowed position. When the computer 105 determines that the running board 210 was properly in the stowed and deployed positions, the computer 105 can determine that the running board 210 is operational. Otherwise, the computer 105 can determine that the running board is not operational.

Figure 5:
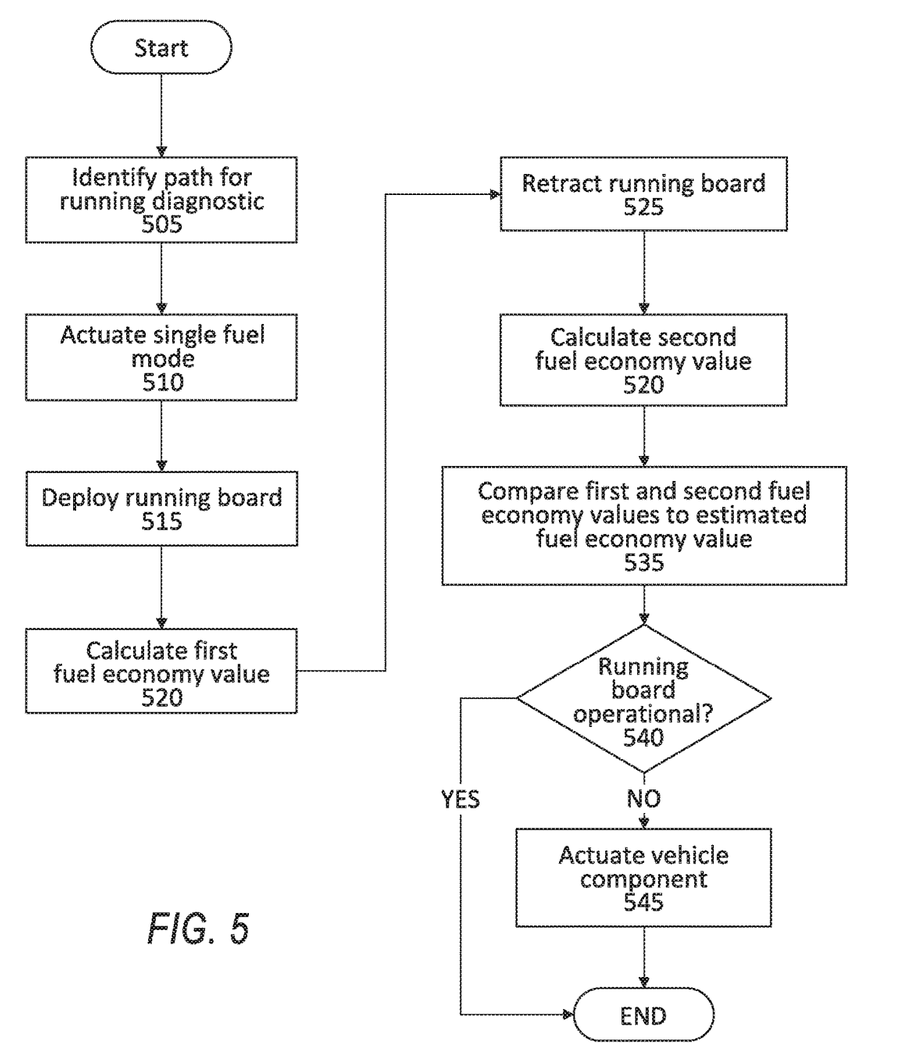
FIG. 5 is a block diagram of an example process for operating the running board in the vehicle.

FIG. 5 illustrates an example process 500 for determining whether a running board 210 is operational. The process 500 starts in a block 505, in which the computer 105 identifies a path 205 for operating the diagnostic for the running board 210. As described above, the path 205 can be determined on the route 200 prior to embarking on the route 200. The path 205 can be determined based on identified favorable conditions, e.g., a substantially straight roadway, little to no traffic, etc.

Next, in a block 510, the computer 105 actuates a single fuel mode for the propulsion 120. As described above, the computer 105 can determine the fuel economy of the vehicle 101 more easily when the propulsion 120 operates in the single fuel mode, i.e., only on fluid fuel or only powered by the electric battery.

Next, in a block 515, the computer 105 deploys the running board 210 to the deployed position. As described above, because of drag on the running board 210, the fuel economy of the vehicle 101 typically drops when the running board 210 is in the deployed position.

Next, in a block 520, the computer 105 calculates a first fuel economy value. As described above, the computer 105 can measure the amount of fuel consumed and/or the amount of battery discharge over a predetermined length along the path 205.

Next, in a block 525, the computer 105 retracts the running board 210 to the stowed position. As described above, when the running board 210 is operational, the first fuel economy value determined when the running board 210 is in the stowed position is expected to be greater than the second fuel economy value determined when the running board 210 is in the deployed position. For example, the first fuel economy value can be about 20 mpg, and the second fuel economy value can be about 18 mpg.

Next, in a block 530, the computer 105 calculates a second fuel economy value. The computer 105 can determine the second fuel economy value of the vehicle 101 when the running board 210 is in the stowed position.

Next, in a block 535, the computer 105 compares the first and second fuel economy values to an estimated fuel economy value such as described above. The estimated fuel economy value can be stored in the data store 106 and/or the server 130. The estimated fuel economy value can be determined based on previous measurements of the fuel economy and/or a standardized fuel economy value for the vehicle 101 make and model. That is, the estimated fuel economy value can represent the fuel economy of the vehicle 101 when the running board 210 is operational and in the stowed position.

Next, in a block 540, the computer 105 determines whether the running board 210 is operational based on the comparison of the first and second fuel economy values and the estimated fuel economy value. For example, if the first fuel economy value (determined when the running board 210 is in the deployed position) is less than the estimated fuel economy value by more than a predetermined threshold, the computer 105 can determine that the running board 210 is properly in the deployed position. Furthermore, if the second fuel economy value (determined when the running board 210 is in the stowed position) is within a threshold of the estimated fuel economy value, the computer 105 can determine that the running board 210 is properly in the stowed position. When the computer 105 determines that, based on the fuel economy values, the running board 210 was properly in the deployed and stowed positions, the computer 105 can determine that the running board 210 is operational. When the computer 105 determines that the running board 210 is operational, the process 500 ends. Otherwise, the process 500 continues in a block 545.

In the block 545, the computer 105 actuates one or more vehicle components 120. For example, the computer 105 can send a message over the network 125 to the owner of the vehicle 101, actuate the propulsion 120 to move the vehicle 101 to a repair location, identify an empty parking spot that is greater than a distance threshold from another occupied parking spot, etc. The computer 105 can access information stored in the data store 106 and/or the server 130 of, e.g., owner contact information, location data 115 of repair locations, etc. The computer 105 can, upon entering a parking lot, actuate one or more sensors 110 (e.g., cameras) to identify an empty parking spot that is greater than a distance threshold from another parking spot where another vehicle 101 is parked. Following the block 545, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   operate a vehicle propulsion in a single fuel mode when a running board is extended;
   determine a first fuel economy value of a vehicle upon extension of the running board; and
   determine that the running board is operational when the first fuel economy value is below an estimated vehicle fuel economy value by at least a first predetermined threshold.

2. The system of claim 1, wherein the instructions further include instructions to determine a second fuel economy value of the vehicle upon retraction of the running board.

3. The system of claim 2, wherein the instructions further include instructions to determine that the running board is operational when the second fuel economy value is greater than the first fuel economy value by at least a second predetermined threshold.

4. The system of claim 1, wherein the instructions further include instructions to actuate a vehicle component upon determining that the running board is not operational.

5. The system of claim 1, wherein the estimated vehicle fuel economy value is based on a fuel economy estimation determined when the running board was previously determined to be operational.

6. The system of claim 1, wherein the instructions further include instructions to, prior to embarking on a predetermined route, identify a portion of the route on which to extend the running board.

7. The system of claim 6, wherein the identified portion of the route is substantially straight.

8. The system of claim 1, wherein the instructions further include instructions to instruct the running board to extend upon identifying no target vehicles within a distance threshold of the vehicle.

9. The system of claim 1, wherein the first fuel economy value is one of a fluid fuel consumption rate and a battery discharge rate.

10. A method, comprising:
    operating a vehicle propulsion in a single fuel mode when a running board is extended;
    determining a first fuel economy value of a vehicle upon extension of the running board; and
    determining that the running board is operational when the first fuel economy value is below an estimated vehicle fuel economy value by at least a first predetermined threshold.

11. The method of claim 10, further comprising determining a second fuel economy value of the vehicle upon retraction of the running board.

12. The method of claim 11, further comprising determining that the running board is operational when the second fuel economy value is greater than the first fuel economy value by at least a second predetermined threshold.

13. The method of claim 10, further comprising actuating a vehicle component upon determining that the running board is not operational.

14. The method of claim 10, wherein the estimated vehicle fuel economy value is based on a fuel economy estimation determined when the running board was previously determined to be operational.

15. The method of claim 10, further comprising, prior to embarking on a predetermined route, identifying a portion of the route on which to extend the running board.

16. The method of claim 15, wherein the identified portion of the route is substantially straight.

17. The method of claim 10, further comprising instructing the running board to extend upon identifying no target vehicles within a distance threshold of the vehicle.

18. The method of claim 10, wherein the first fuel economy value is one of a fluid fuel consumption rate and a battery discharge rate.

19. A system, comprising a computer including a processor and a memory, the memory storing instructions executable by the processor to:
- determine a first fuel economy value of a vehicle upon extension of a running board;
- determine that the running board is operational when the first fuel economy value is below an estimated vehicle fuel economy value by at least a first predetermined threshold; and
- actuate a vehicle component upon determining that the running board is not operational.

20. A method, comprising:
- determining a first fuel economy value of a vehicle upon extension of a running board;
- determining that the running board is operational when the first fuel economy value is below an estimated vehicle fuel economy value by at least a first predetermined threshold; and
- actuating a vehicle component upon determining that the running board is not operational.

* * * * *